United States Patent
Weinlader

(10) Patent No.: US 9,682,723 B2
(45) Date of Patent: Jun. 20, 2017

(54) CONTROL LINKAGE FOR HYDROSTATIC DRIVES ON LAWN MOWERS

(71) Applicant: J. Keith Weinlader, Lancaster, PA (US)

(72) Inventor: J. Keith Weinlader, Lancaster, PA (US)

(*) Notice: Subject to any disclaimer, the term of this patent is extended or adjusted under 35 U.S.C. 154(b) by 113 days.

(21) Appl. No.: 14/554,362

(22) Filed: Nov. 26, 2014

(65) Prior Publication Data

US 2015/0150189 A1    Jun. 4, 2015

Related U.S. Application Data

(60) Provisional application No. 61/910,659, filed on Dec. 2, 2013.

(51) Int. Cl.
| | |
|---|---|
| *B62D 7/00* | (2006.01) |
| *B62D 11/00* | (2006.01) |
| *A01D 34/68* | (2006.01) |

(52) U.S. Cl.
CPC .... *B62D 11/006* (2013.01); *A01D 2034/6843* (2013.01)

(58) Field of Classification Search
CPC .......... B62D 11/006; B62D 7/16; B62D 7/20
USPC ............................................. 180/6.32, 6.48
See application file for complete search history.

(56) References Cited

U.S. PATENT DOCUMENTS

| | | | |
|---|---|---|---|
| 5,725,068 A | 3/1998 | Smith, Jr. | |
| 6,523,635 B1 | 2/2003 | Johnston et al. | |
| 7,234,301 B1 | 6/2007 | Hauser | |
| 7,634,953 B2 | 12/2009 | Hoffman et al. | |
| 8,386,135 B2 | 2/2013 | Brand et al. | |
| 8,522,901 B1* | 9/2013 | VanLue | B60K 17/30 180/19.3 |
| 9,021,914 B1* | 5/2015 | Newcomb | G05G 11/00 74/479.01 |
| 2009/0044506 A1* | 2/2009 | Nunez | A01D 34/824 56/11.3 |
| 2009/0056492 A1* | 3/2009 | Trefz | A01D 34/69 74/484 R |

\* cited by examiner

*Primary Examiner* — Jacob Knutson
(74) *Attorney, Agent, or Firm* — Miller Law Group, PLLC

(57) ABSTRACT

Foot operated control linkages overlie the conventional control lever operating system on a spin turn mower to operate the mower in either forward or reverse directions. Each control linkage uses a foot pedal to control the speed of the mower while the control levers remain operable, even while the mower is moving, to change the forward or reverse direction of travel of the mower. The forward control linkage includes a first set of springs that pull the control levers against a stop while a second control spring prevents the first springs from moving the mower until the foot pedal is depressed. Thus, when the foot pedal is allowed to return to a non-depressed position, the mower will revert to a neutral detent position in which the mower is not powered in any direction.

20 Claims, 6 Drawing Sheets

CONTROL LINKAGE FOR HYDROSTATIC DRIVES ON LAWN MOWERS

CROSS-REFERENCE TO RELATED APPLICATIONS

This application claims domestic priority on U.S. Provisional Patent Application Ser. No. 61/910,659, filed on Dec. 2, 2013, the content of which is incorporated by reference.

FIELD OF THE INVENTION

This invention relates generally to spin-turn lawn mowers that are driven by hydrostatic motors and operated through pivoted control levers, and more particularly, to a control linkage that controls the speed of operation of the lawn mower while allowing the pivoted control levers to be utilized for steering control and reverse operation.

BACKGROUND OF THE INVENTION

Spin turn lawn mowers are becoming popular for use in mowing lawns by both commercial lawn care operations and residential owners, displacing the conventional tractor-like mowers which are controlled via a steering wheel and a separate speed control. Spin turn lawn mowers are typically operated from the operator seat by moving one or both of a pair of pivoted control levers that are position in front of the operator seat for easy access by the operator. Forward movement of the lawn mower is accomplished by pushing forward on both pivoted control levers, while steering is accomplished by an unequal displacement of the control levers. For example, a forward moving left turn would be accomplished by pushing the right control lever forwardly more than the left control lever. The term "spin turn" is derived by the ability of these hydrostatically driven lawn mowers to be turned in place by pulling one control lever rearwardly while pushing the other control lever forwardly.

The structural configuration of many spin turn lawn mowers is that the engine is mounted on the frame of the mower over the rear wheels and behind the operator seat. The frame is supported by four wheels with the two rear wheels being driven by hydrostatic motors and pumps and the two front wheels being caster wheels that have very little weight on them. This weight distribution produces an inherent stability problem, particularly when the spin turn lawn mower is operated on wet slopes. The apparent problem with the conventional spin turn mower configuration is that the front wheels are not controlled. Thus, if either of the rear wheels loses traction, e.g. while traveling over a wet sloped lawn surface, the mower goes into a flat spin and often results in a loss of control of the lawn mower.

Manufacturers of spin turn lawn mowers have been addressing this control problem with hydrostatic control systems that are spring-biased to a neutral position so that releasing the control levers allows the control system to cease driving the mower; however, under many conditions, once the mower has started into a flat spin the mower will continue the motion until the surface conditions change. Walker Manufacturing of Fort Collins, Colo., manufactures a spin turn mower that has a single lever on the console for controlling the speed of operation of the mower and then a pair of levers centrally in front of the operator to vary the speed of each wheel individually to accomplish turns of the mower. The Walker Manufacturing control mechanism would limit the ability of an operator to make radical movements of the pivoted control levers which can cause traction loss for the mower.

In U.S. Pat. No. 5,725,068, granted on Mar. 10, 1998, to Theodore Smith, Jr., a mechanical linkage is disclosed to limit the forward speed of the hydrostatic drive to provide a more effective operation of the vehicle to rake sand traps on golf courses. An integrated steering wheel that controls the movement of the rear steering wheels is disclosed in U.S. Pat. No. 7,234,301, granted to Raymond Hauser on Jun. 26, 2007. Another version of a steering wheel control can also control the front wheels in addition to the rear steering wheels; however, such a steering mechanism is complicated in construction, although the steering mechanism does improve stability on sloped surfaces since the front wheels are placed under control by the steering mechanism.

The spring-biased neutral position for hydrostatic, spin-turn lawn mowers is disclosed in U.S. Pat. No. 7,634,953, granted to Brad Hoffman, et al on Dec. 22, 2009, and assigned to Deere & Company. An electronic system for monitoring a hydrostatic drive, and for bringing the hydrostatic drive into a safe state when a control fault occurs, is disclosed in U.S. Pat. No. 8,386,135, issued to Michael Brand, et al, on Feb. 26, 2013. A steering mechanism and ground speed control for a windrower, a hay harvesting machine that is hydrostatically driven, is taught in U.S. Pat. No. 6,523,635, Issued on Feb. 25, 2003, to Robert Johnston, et al.

Furthermore, the operation of hydraulically driven mowers is difficult to control for novice operators. The sensitivity of the lever controls results in a turn in direction of movement when one of the control levers is moved without a corresponding movement of the other control lever. Novice operators are known to have difficulty in keeping the position of the two control levers at corresponding positions, resulting is further instability of the operation of spin turn lawn mowers. Accordingly, a cruise control linkage could be desirable to enable the spin turn lawn mower to be operated in a straight line while mowing.

It would be further desirable to provide a control mechanism for a spin turn lawn mower that improves stability of the mower without changing the overall configuration of the mower. It would also be desirable to provide a control mechanism that overlies the conventional pivoted control lever system for a spin turn lawn mower to separate the forward speed control from the steering control for the mower. Providing a foot control for operating the spin turn lawn mower in either a forward or a rearward direction would be of further desirability, particularly if the control levers could be operated to override the foot controls to provide directional control.

SUMMARY OF THE INVENTION

It is an object of this invention to overcome the disadvantages of the prior art by providing a control linkage that is cooperable with the conventional lever control mechanism on a spin turn mower to provide forward speed control through a foot pedal.

It is a feature of this invention that the forward speed control of the spin turn mower would be manipulated by operation of a user-friendly foot pedal instead of requiring the use of the conventional lever controls.

It is an advantage of this invention that the stability of the mower operation would be enhanced.

It is another feature of this invention that the control linkage overlays on the conventional lever controls of a spin turn mower.

It is another advantage of this invention that the changes in direction of the spin turn mower are accomplished through utilization of the conventional lever controls.

It is still another feature of this invention that the changes in direction for the spin turn mower are accomplished by slowing the operative speed on one side of the mower, rather than increasing the operative speed on one side of the mower.

It is another feature of this invention that the control linkage prevents the operator of a spin turn mower to change direction of travel by increasing the operative speed on one side of the mower.

It is still another advantage of this invention that controllability of the spin turn mower is enhanced by requiring changes in direction of travel to be accomplished by slowing operative speed on one side of the mower.

It is another advantage of this invention that the overall speed of operation of the spin turn mower does not increase as the mower is manipulated to change direction when the control linkage is utilized.

It is another object of this invention to provide a control linkage for the operation of a spin turn mower that utilizes a foot pedal to control forward speed of the mower while relying on the conventional operation of the lever controls to change direction and to move into a reverse direction.

It is still another feature of this invention that the lever controls can be used while the foot pedal is engaged to move the spin turn mower in a forward direction to change the direction of travel of the mower, or to override the foot pedal control linkage.

It is still another advantage of this invention that the operation of a spin turn mower can be intuitive and, therefore, more easily operated and controlled.

It is yet another object of this invention to provide an overlying control linkage that can operate to take command of the forward speed function of the conventional control levers on a spin turn mower, while permitting the control levers to be manipulated in a normal, conventional movement to affect turning of the mower in either direction, and to also retain the reverse movement operation of the control levers.

It is yet another feature of this invention that the control linkage includes a first spring configuration that urges the conventional control levers toward a maximum forward position and an offsetting second spring that maintains the hydraulic pumps operated by the conventional control levers in a neutral detent position until the foot pedal is depressed.

It is yet another advantage of this invention that the second control spring allows the foot pedal control to manipulate the conventional control levers into a forward moving direction, while maintaining the integrity of the internal bias of the hydraulic pumps to urge the system into the neutral position as intended by the design of the hydraulic system.

It is a further advantage of this invention that when the spin turn mower encounters an unstable situation and starts into a flat spin, the operator need only to raise his/her foot to allow the foot pedal to retract to its rearwardmost position and stop the driving of the mower, which will help the mower to cease spinning and return the mower to proper operational control by reason of the foot pedal tension spring pushing the sleeves against the stops to push the control levers rearwardly into the neutral position.

It is still another advantage of this invention that the natural instinct to raise one's foot to cease forward speed, which is greater than the instinct to manipulate one's hands to change forward speed, can be utilized in a panic situation to stabilize the operation of a spin turn mower.

It is a further feature of this invention that the overlying control linkage can be installed as an after-market kit on existing spin turn mowers, as well as incorporated into the factory control linkage therefor.

It is still another object of this invention to provide a foot control for operating a spin turn lawn mower in a reverse direction during which the control levers can still be manipulated to change the direction of movement of the mower.

It is another feature of this invention that the foot control overlying the conventional hydraulic lever control system for a spin turn mower will provide a cruise control operation.

It is yet another object of this invention that the cruise control operation associated with a foot operated control linkage can be applied to other configurations of spin turn mowers, including one where the operator stands during operation of the mower.

It is another advantage of this invention that the operation of the foot control mechanism results in a straight line operation of the spin turn mower.

It is still another advantage of this invention that the foot control mechanism enables a novice operator to maintain a more stable straight line control over a spin turn mower.

It is still another feature of this invention that the foot controls can be configured to selectively move the spin turn mower in both forward and rearward directions while allowing the hydraulic control levers to be utilized to change direction of movement in either the forward or rearward direction.

It is a further object of this invention to provide a control linkage for a spin turn mower having a pair of control levers operatively connected to a hydraulic drive mechanism to power the movement of the spin turn mower, each control lever being pivotally mounted about a hinge point such that a forward movement of said control levers from a central neutral position results in a forward powered movement of the spin turn mower in which a foot pedal is pivotally supported for movement in a fore-and-aft direction, the foot pedal being operatively connected to said control levers to control speed of forward movement of the spin turn mower, and in which a connecting linkage permits movement of each said control lever in a forward or rearward direction to effect a change of direction of travel of the spin turn mower.

These and other objects, features and advantages are accomplished according to the instant invention by providing control linkages that overlie a conventional control lever operating system on a spin turn mower to operate the mower in either forward or reverse directions. Each control linkage uses a foot pedal to control the speed of the mower while the control levers are operable, even while the mower is moving, to change the direction of travel of the mower. The forward control linkage includes a first set of springs that pull the control levers against a stop while a second control spring prevents the first springs from moving the mower until the foot pedal is depressed. Thus, when the foot pedal is allowed to return to a non-depressed position, the mower will revert to a neutral detent position in which the mower is now powered in any direction. The reverse control linkage also permits the conventional control levers to be used to change direction of the mower in a reverse direction.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE INVENTION

Figure 1:
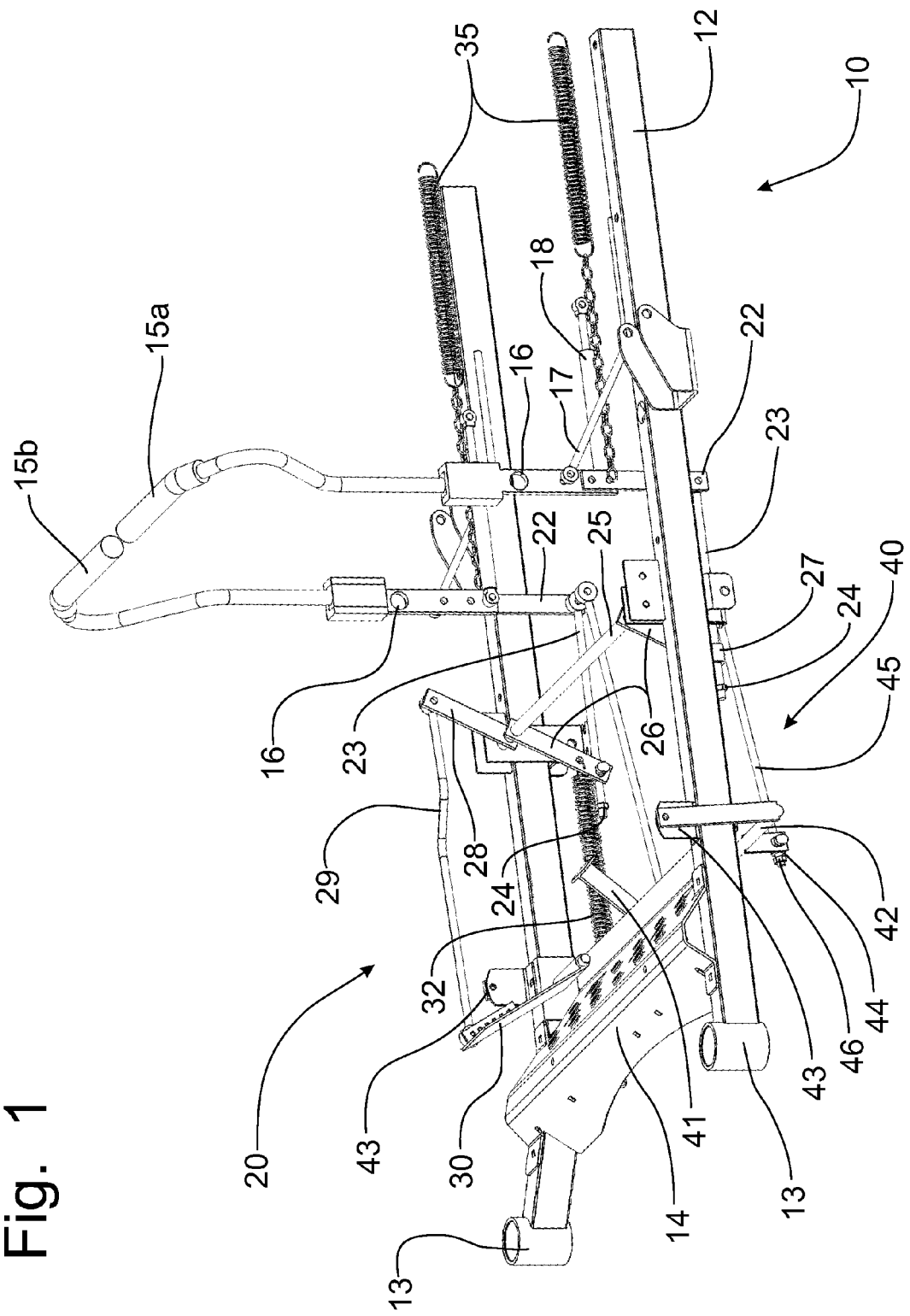
FIG. 1 is a left, front perspective view of the frame of a spin turn lawn mower with the conventional pivoted control levers shown and the overlying forward and rearward speed control linkages incorporating the principles of the instant invention, the conventional power transmission components, operator seat, mower deck and other components of the spin turn lawn mower being removed for purposes of clarity.
Figure 2:
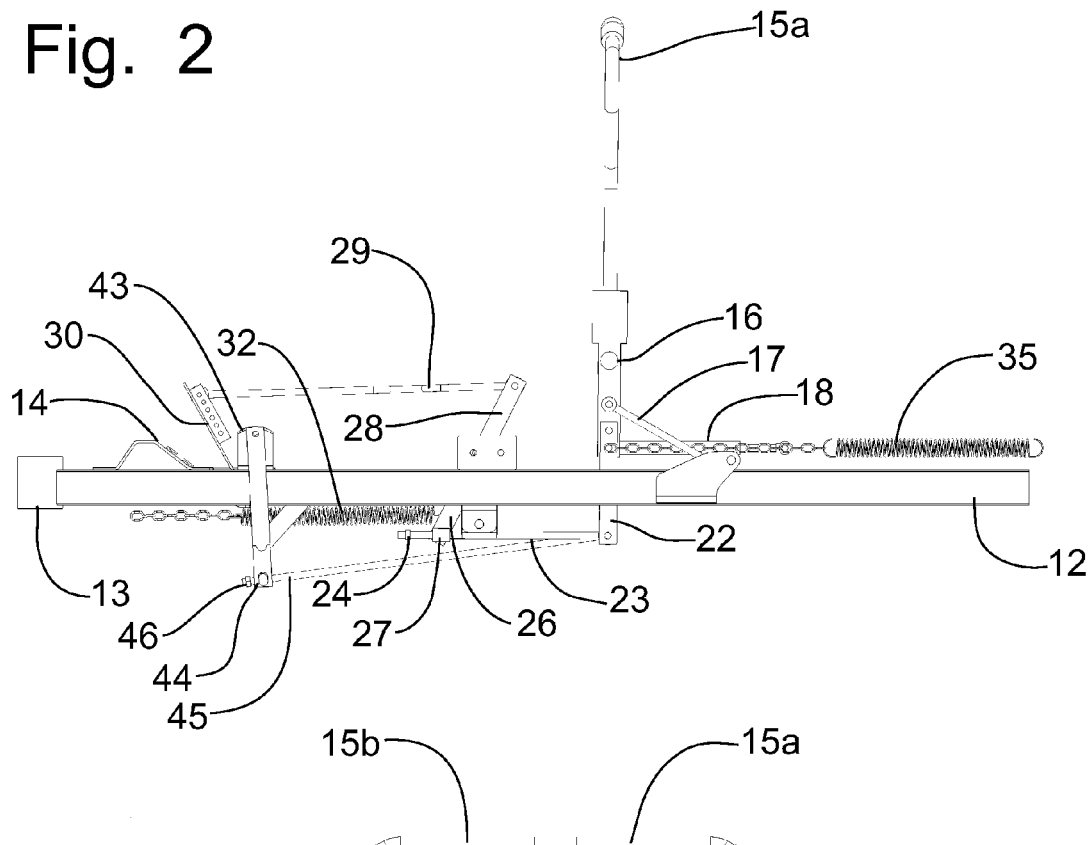
FIG. 2 is a left side elevational view of the frame and controls as shown in FIG. 1.
Figure 3:
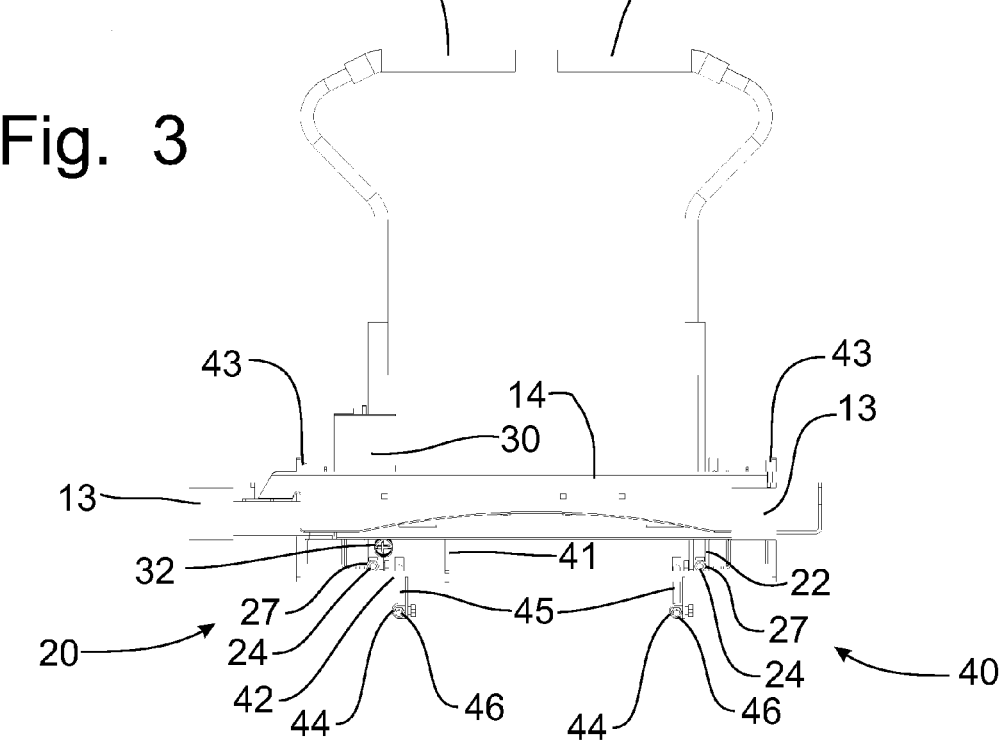
FIG. 3 is a front elevational view of the frame and controls as shown in FIGS. 1 and 2.
Figure 4:
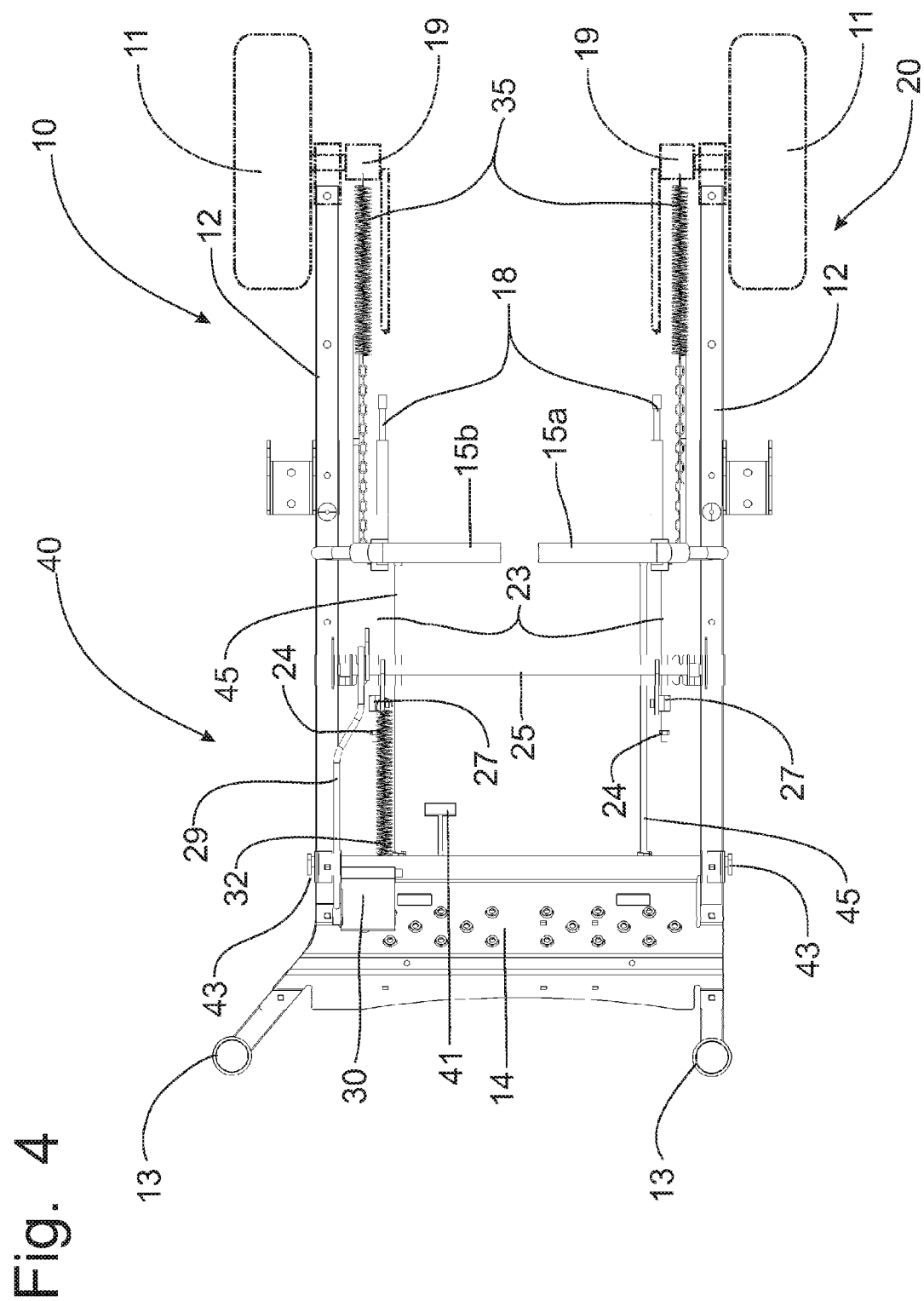
FIG. 4 is a top plan view of the frame and controls as shown in FIGS. 1-3 representative rear drive wheels and associated hydraulic motors being shown in phantom.
Figure 5:
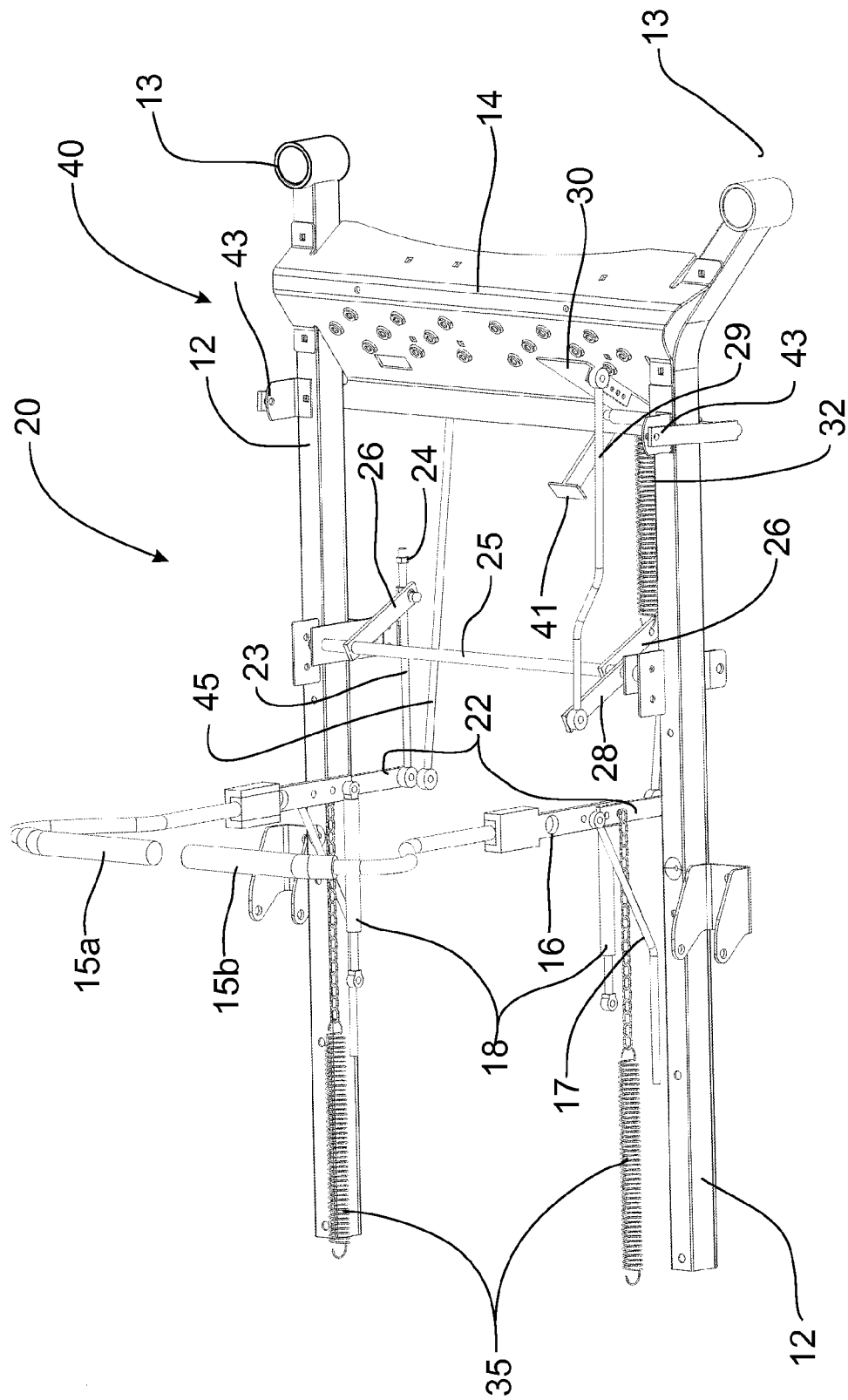
FIG. 5 is a right side perspective view of the frame and controls as depicted in FIG. 1.
Figure 6:
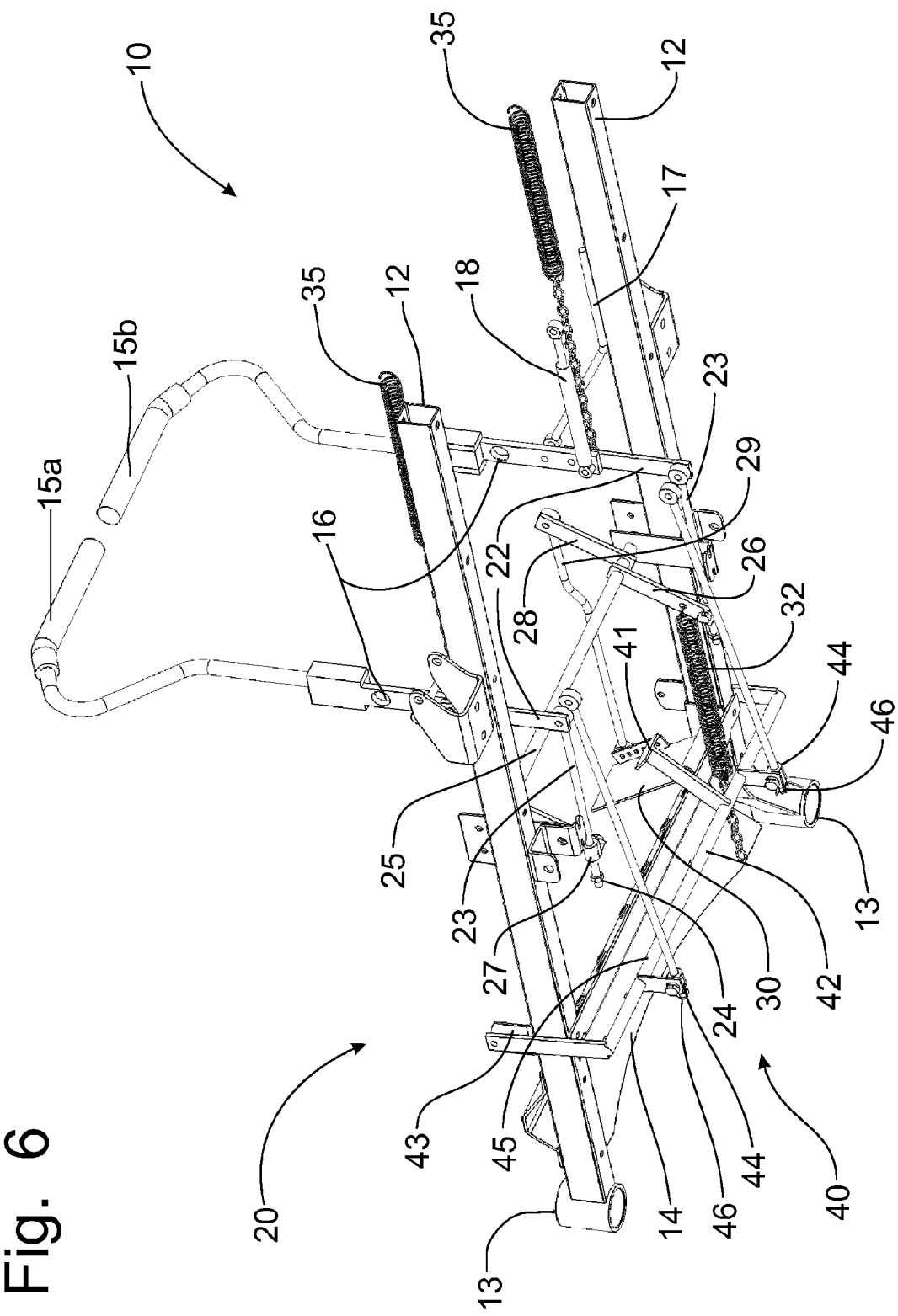
FIG. 6 is a left side perspective view of the frame and controls as depicted in FIG. 5.
Figure 7:
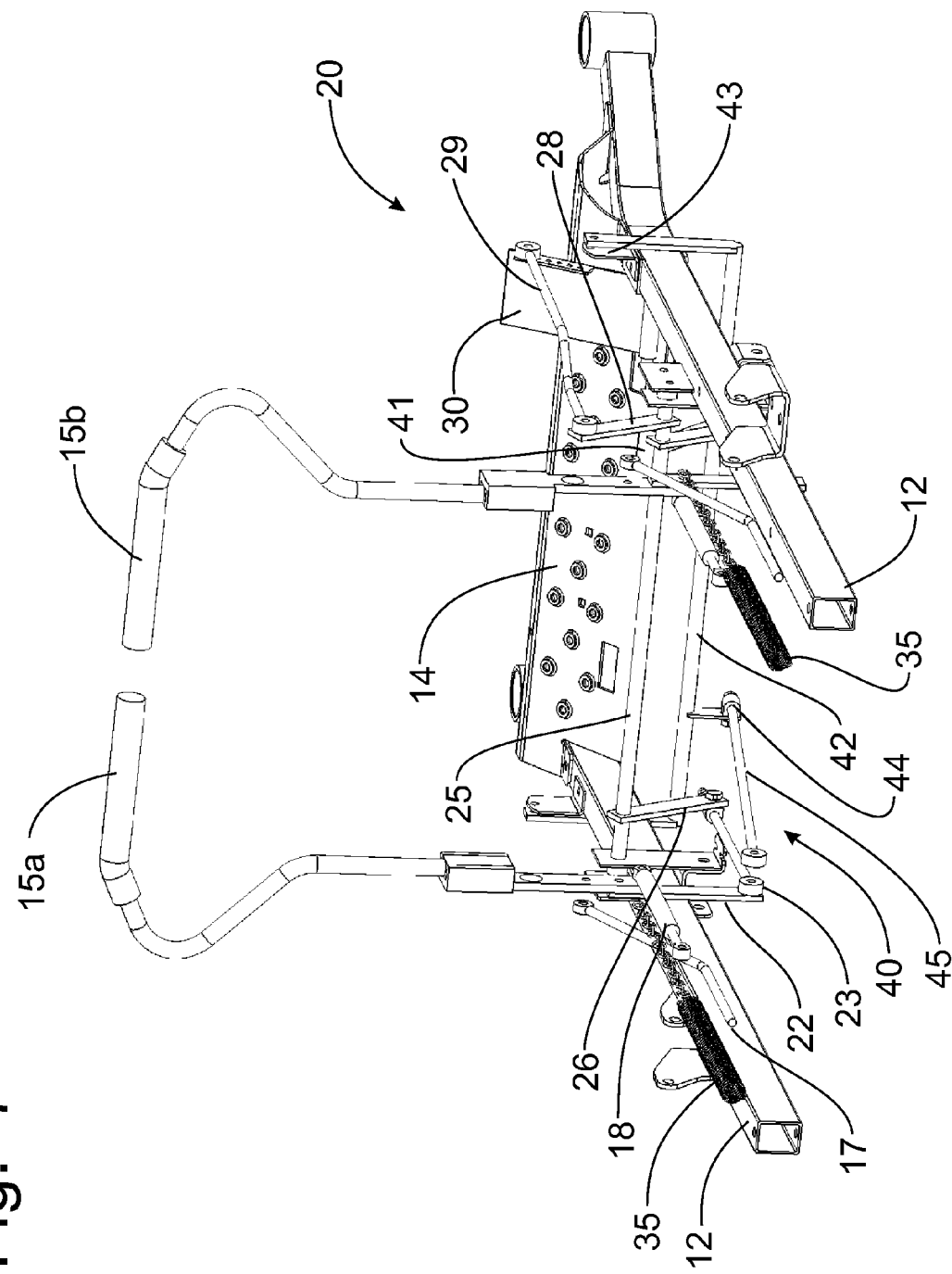
FIG. 7 is a right, rear perspective view of the frame and controls as depicted in FIG. 5.

Referring now to the drawings, the structural components of the frame of a spin turn lawn mower can best be seen. Any left and right references are used as a matter of convenience and are determined by standing at the rear of the frame F and facing the forward direction, the normal direction of travel, with the foot control and foot rest being mounted at the forward end of the frame F. The conventional configuration of the spin turn lawn mower on which the overlying control mechanism 20, incorporating the principles of the instant invention, is based can be seen in U.S. Pat. No. 7,634,953, granted to Brad Hoffman, et al on Dec. 22, 2009, the content of which is hereby incorporated by reference in its entirety.

With reference to the drawings and, specifically, with reference to FIG. 1, the frame components of a spin turn lawn mower as depicted in the aforementioned U.S. Pat. No. 7,634,953, the content of which is incorporated herein by reference, is shown. Such components of the frame 10 would include a pair of longitudinally extending frame rails 12 interconnected at the forward ends thereof by a foot rest 14. The forward ends of the frame rails 12 are formed with caster mounts 13 to allow the mounting of the front caster wheels (not shown). The rear drive wheels 11 are supported on the rear ends of the frame rails, along with the engine (not shown), hydraulic pumps (not shown) and hydraulic motors 19. Additional frame members (not shown) have been removed from the drawings for purposes of clarity with respect to the instant invention; however, one skilled in the art will recognize that certain components of the instant invention described in greater detail below require anchoring on such additional frame components.

The hydraulic pumps (not shown) are controlled through manipulation of the control levers 15a, 15b in a forward or rearward direction from the neutral position depicted in the drawings. As noted in the aforementioned U.S. Pat. No. 7,634,953, this neutral position is spring-biased so that a release of the control levers 15a, 15b will result in the hydraulic pumps being placed in the neutral position so that the pumps do not power the associated hydraulic motors 19 to propel the frame 10 of the spin turn mower. The control levers 15a, 15b are pivotally mounted on the frame 12 at respective pivots 16. Thus, as each control lever 15a, 15b is pushed forwardly, the lower ends thereof move rearwardly. As a result, the connecting rods 17, extending from the lower ends of the control levers 15a, 15b stroke the hydraulic pumps (not shown) appropriately to drive hydraulically the hydraulic motors 19 to propel the spin turn mower forwardly.

In the conventional configuration, the further forwardly the control levers 15a, 15b are pushed the faster the spin turn mower moves in the forward direction. The same applies to the rearward movement of the mower. The further rearwardly the control levers 15a, 15b are pulled toward the operator, which is seated immediately behind the control levers 15a, 15b, so as to have convenient access thereto, the faster the mower moves rearwardly. One skilled in the art will recognize that the conventional controls of the spin turn mower are configured that the mower will have a maximum forward speed that is significantly greater than the maximum rearward speed. Turning the mower is accomplished by moving the respective control levers 15a, 15b at different relative positions with respect to the operator.

For example, pushing the left control lever 15a further forwardly than the right control lever 15b will result in the mower moving forwardly and simultaneously turning to the right. By pulling the left control lever 15a rearwardly and pushing the right control lever 15b forwardly, or vice-versa, the left rear wheel will rotate in reverse while the right rear wheel will rotate forwardly, resulting in the mower doing a spin turn in place. The dampening cylinders 18 are provided to smooth out the movement of the control levers 15a, 15b so that radical movement of the control levers 15a, 15b is restricted.

A primary object of the instant invention is to provide an overlying control linkage 20 that can operate to take command of the forward speed function of the control levers 15a, 15b, while permitting the control levers 15a, 15b to be manipulated in a normal, conventional movement to affect turning of the mower in either direction, and to also retain the reverse movement operation of the control levers 15a, 15b. A secondary object of the instant invention is to provide a cruise control function that will enable a novice operator to operate the spin turn mower easily in a forward straight line of operation. Another object of this invention is to provide a foot control that will operate the mower in a rearward direction while allowing the operator to manipulate the control levers 15a, 15b in a rearward direction to control changes in direction of travel.

The forward control linkage 20 includes an extension 22 to each of the control levers 15a, 15b to extend the downward length of the control levers 15a, 15b in order to balance the movement of the other components of the control linkage 20, as will be described in greater detail below. The forward control linkage 20 also includes a transverse rock shaft 25 that has a pair of downwardly extending mounting tabs 26 corresponding to the opposing extensions 22. Each mounting tab 26 is formed with a sleeve 27 that slidingly receives a connecting rod 23. Each connecting rod 23 a positionably adjustable stop, such as a nut 24 threaded onto the end of the rod 23. The rearward end of each the connecting rod 23 is pivotally connected to the corresponding extension 22 such that the movement of the control levers 15a, 15b results in a corresponding movement of the connecting rods 23.

The forward control linkage 20 further includes an upwardly extending mounting tab 28 that is fixed to the rock shaft 25 and rotates therewith, as will be described in greater detail below. Extending forwardly from the upwardly extending mounting tab 28 is a longitudinally extending control rod 29 that is pivotally connected to a foot control pedal 30 pivotally supported on the foot rest 14. A tension spring 32 interconnects the foot pedal 30 and the mower frame 10 to bias the foot pedal into a rearward position, corresponding to a zero speed position. In other words, the foot pedal 30 is biased to the neutral position by the tension spring 32.

The forward control linkage 20 further includes a pair of control lever tension springs 35 that bias the control levers 15a, 15b toward a full speed forward position, i.e. urging the control levers fully forwardly relative to the operator. In this configuration, the springs 35 pull the control lever extensions 22 rearwardly, thus pushing the control levers 15a, 15b forwardly, until the stop 24 engages the sleeve 27 carried on the mounting tabs 26 and biases a rotation of the rock shaft 25 in a manner to urge the upwardly extending mounting tabs 28 forwardly, which serves to urge the foot pedal 30 forwardly toward the foot rest 14. However, because the foot pedal tension spring 32 exerts a greater biasing force on the foot pedal 30 to pull the foot pedal rearwardly than the two control lever tension springs 35 exert to push the foot pedal forwardly, the foot pedal 30 does not move forwardly as a result of the bias force exerted by the tension springs 35. The tension springs 35, however, do have the effect of keeping the stops 24 engaged with the sleeves 27, until steering the mower is desired, as will be described in greater detail below.

One key to the operation of this particular control linkage configuration is that the hydraulic pumps are configured with a neutral detent and an internal biasing force that urges the control levers 15a, 15b into the neutral position. The control springs 35 exert a substantial biasing force that is capable of overcoming the internal bias of the hydraulic pumps that keep the system centered in neutral, but the more powerful foot pedal tension spring 32 offsets the force exerted by the control springs 35 to keep the system centered in the neutral position as intended by the design of the hydraulic system.

When the operator desires to move the mower forwardly, the operator depresses the foot pedal 30 toward the foot rest 14, overpowering the bias force exerted by the foot pedal tension spring 32 such that the force exerted by the operator combined with the bias force exerted by the control lever tension springs 35 is greater than the bias force from the foot pedal spring 32. The depressing of the foot pedal 30 pulls the upwardly extending mounting tab 28 and interconnecting control rod 29 forwardly and results in a rotation of the rock shaft 25 to move the downwardly extending mounting tab 26 rearwardly. Because of the force exerted on the extensions 22 by the control lever tension springs 35, the stop 24 stays engaged with the sleeve 27 and allows the control levers 15a, 15b to move forwardly, and stroke the hydraulic pumps to move the mower forwardly at a speed corresponding to the extent of depression of the foot pedal 30. According, the further the foot pedal 30 is depressed, the faster the mower is powered forwardly.

One skilled in the art will recognize that the action of depressing the foot pedal 30 causes an equal displacement of the two control levers 15a, 15b so that the mower is moved forwardly ahead along a straight line. Accordingly, the use of the foot pedal 30 results in a cruise control operation that helps a novice operator in controlling the operation of the spin turn lawn mower. When a change in forward direction is desired, the operator need only pull rearwardly the control lever on the same side of the mower as the desired turn direction. For example, if the operator wants to turn to the left as the mower is moving forwardly as a result of the operator depressing the foot pedal 30, the operator would pull the left control lever 15a slightly rearwardly to slow slightly the left hydraulic motor and cause the mower to turn to the left.

Using the example of a left turn as described above, the movement of only the left hand control lever 15a rearwardly causes the connecting rod 23 to push forwardly through the corresponding sleeve 27 and push the stop 24 at the end of the connecting rod 23 forwardly of the sleeve 27, while the opposing connecting rod 23 stays in the selected position with the stop 24 thereof engaged with the corresponding sleeve 27. Accordingly, the receipt of the connecting rods 23 through the sleeve 27 carried at the end of the downwardly extending mounting tab 22 allows the control levers 15a, 15b to continue in use to change direction of forward travel of the mower in substantially the same manner as is conventional for known spin turn lawn mowers. However, one skilled in the art will recognize that changes in direction of travel in a conventional spin turn mower can be accomplished also by pushing forwardly the control lever opposite the desired direction of turn to speed up the opposite hydraulic pump. Accordingly, the forward directional turns can only be accomplished through the control linkage 20 by slowing the same hydraulic pump as the desired turn.

In addition to the forward control linkage 20, a reverse control linkage 40 is provided to move the spin turn mower in reverse. One skilled in the art will recognize that the reverse control linkage 40, as will be described in greater detail below, utilizes a separate foot pedal 41 from the forward direction foot pedal 30; however, the pedals 30, 41 could be combined or re-positioned from that shown in the drawings to provide the same function as described below. The operation of the reverse control linkage 40 operates on the same general principle as the forward control linkage 20, a foot pedal is manually operated to control the movement of the hydraulic control levers 15a, 15b through connecting rods having stops mounted thereon that allow the operation of the hydraulic control levers 15a, 15b to be utilized to affect changes in direction.

The reverse control linkage 40 includes a transverse bar 42 to which the reverse foot pedal is rigidly affixed. The transverse bar 42 is supported for pivotal movement by support brackets 43 located on the opposing frame rails 12 such that when the reverse foot pedal 41 is depressed the reverse foot pedal 41 and transverse bar 42 pivot with the support brackets 43 to move in a forward direction. A pair of laterally spaced connecting rods 45 is connected to the transverse bar 42 by sleeves 44 that slidably receive the connecting rods 45. Each of the connecting rods 45 have a stop member 46 mounted at the forward end thereof such that the forward movement of the transverse bar 42 moves the sleeves 44 forwardly with the transverse bar 42 and the stop members 46 pull the connecting rods 45 forwardly.

The rearward ends of the connecting rods 45 are connected to the extensions 22 on the hydraulic control levers 15a, 15b adjacent to the connections of the connecting rods 23. Thus, the forward movement of the connecting rods 45, as described above, results in a rearward movement of the hydraulic control levers 15a, 15b that is associated with the rearward movement of the spin turn lawn mower. The positioning of the stop members 46 at the forward ends of the connecting rods 45 enables either of the hydraulic control levers 15a, 15b to be pulled rearwardly beyond the movement induced by the movement of the reverse foot pedal 41. One skilled in the art will recognize that the movement of the hydraulic control levers 15a, 15b induced by the reverse foot pedal 41 is not intended to force the mower to move rearwardly at the maximum possible reverse speed permitted by the hydraulic motors. Most operators infrequently move a spin turn mower in reverse and when reverse is utilized the speed and duration of the reverse movement is typically minimal.

Rearward movement of the spin turn lawn mower can also be accomplished in the same manner as is conventional for such mowers, i.e. the operator pulls rearwardly on the control levers 15a, 15b until the control levers 15a, 15b are rearward of the central neutral position, irrespective of whether the reverse foot pedal 41 is depressed. Even if the operator would forget to release the forward foot pedal 30, the manual movement of the control levers 15a, 15b rearwardly of the position corresponding to the depression of the forward foot pedal 30 will slow the mower's forward speed and allow the mower to be operated in reverse in a conventional manner known for spin turn lawn mowers. Preferably, with the foot pedal 30 released, the foot pedal spring 32 will return the foot pedal 30 to its rearwardmost position, corresponding to a central neutral position for the hydraulic control levers 15a, 15b and allow any additional rearward movement of the control levers 15a, 15b to operate the mower in a conventional manner known for spin turn mowers. The further rearward movement of the control levers 15a, 15b results in a movement of the connecting rods 23 through the sleeve 27 carried at the distal end of the downwardly extending mounting tabs 26 with the stops 24 pushing forwardly of the corresponding sleeves 27. The further rearward movement of the control levers 15a, 15b also results in a forward movement of the connecting rods 45 through the sleeves 44 carried by the transverse bar 42.

Once the controlled rearward movement of the mower is completed, the operator need only release the reverse foot pedal 41, and any grip the operator might have on the control levers 15a, 15b, to allow the control lever tension springs 35 and the internal biasing of the hydraulic pumps to return the hydraulic drive mechanism into the central neutral position. Once the foot pedal 30 has been released to allow the foot pedal 30 to be raised to the maximum rearward position, the aforementioned relationships between the tension springs 32, 35 are such that the mower drive mechanism is returned to the neutral position.

In the event the spin turn mower encounters an unstable situation and starts into a flat spin, a panicked operator need only raise his/her foot to allow the foot pedal to retract automatically to its rearwardmost position to stop the driving of the mower, which will help the mower to cease spinning and to return the mower to proper operational control by reason of the foot pedal tension spring 30 pushing the sleeves 27 against the stops 24 to push the control levers 15a, 15b rearwardly into the neutral position. One skilled in the art will recognize that the instinct to raise one's foot to cease forward speed is greater than the instinct to manipulate one's hands to change forward speed in a panic situation.

The overlying control linkages 20, 40 serve to control the overall forward and rearward speeds of the spin turn mower, removing that function from the exclusive operation of the control levers 15a, 15b. Changing direction of travel in either the forward or rearward direction is simply accomplished through manipulation of a single control lever 15a, 15b. In the operation of a prototype control linkage 20, changing the forward direction of travel was accomplished through the use of a single hand of the operator resting on the two control levers 15a, 15b with a simple turn of the wrist to nudge the selected control lever 15a, 15b to cause a turning of the spin turn mower.

While the above-described control linkages 20, 40 can be provided as a kit or kits to retrofit existing spin turn mowers having a central neutral detent, one skilled in the art will recognize that such control linkages could be incorporated into the original manufacture of spin turn mowers. Still further, the function of the aforementioned control linkages 20, 40 can be incorporated into the hydraulic drive mechanism for a spin turn mower without requiring all of the component parts of the control linkage, as are described above. For example, a foot pedal 30 can be incorporated into a spin turn mower that either mechanically or electronically controls the forward speed of the spin turn mower, allowing the control levers 15a, 15b, or other steering devices, such as a T-bar control or a conventional steering wheel control, to be manipulated to change direction of travel, and/or to effect a reverse direction of travel.

The basic premise is that the forward speed control is separated from the steering control such that the forward speed control is attained by manipulation of the foot pedal 30, while the control levers 15a, 15b are utilized to control the changes in direction of travel by trimming the speed of one of the hydraulic drive motors over the other hydraulic drive motor. Similarly, the rearward movement of the mower is separated from the steering control as well. As a result, a more precise steering control can be obtained while reducing the risk of overcontrolling the control levers in a panic situation. Accordingly, the principles of the instant invention can be adapted for use as original equipment on a spin turn lawn mower, either as a mechanical linkage or built into the hydraulic control mechanism, and can be utilized with lever controls, T-bar controls or conventional steering wheel controls for spin turn lawn mowers.

One skilled in the art will recognize upon a reading of this disclosure that the drawings exaggerate the orientation of the connecting rods 23, 45 relative to sleeves 27, 44 so that the stops 24, 46 can be seen. In the drawings, the respective positions of the stops 24, 46 relative to the corresponding sleeves 27, 44 are the equivalent of the foot pedals 30, 41, respectively, being released to return to its home position while the control levers 15a, 15b are manipulated to move the spin turn mower for changes in forward or reverse directions, since both stops 24, 46 are shown pushed forwardly of the corresponding sleeves 27, 44 with the control levers 15a, 15b being equally displaced relative to the frame 10 of the spin turn mower.

In summary, the forward and rearward control linkages 20, 40 provide an alternative mechanism for operating the forward and rearward movements of a spin turn lawn mower in a manner that does not prevent the normal, conventional utilization of the hydraulic control levers 15a, 15b to move the mower in either the forward or rearward directions. With both the forward and rearward control linkages 20, 40 installed, the operator can ignore the control linkages 20, 40 and completely control the lawn mower using the hydraulic control levers 15a, 15b. When the control levers 15a, 15b are pushed forwardly to move the mower forwardly, the stops 24 on the connecting rods 23 engage the sleeves 27 and pull the control rod 29 forwardly to cause the foot pedal 30 to depress. Simultaneously, the reverse connecting rods 45 also pull rearwardly to engage the stops 46 with the sleeves 44 and cause the transverse bar 42 to pivot rearwardly, which in turn forces the reverse foot pedal 41 to push upwardly. The rearward movement of the control levers 15a, 15b to cause the mower to move rearwardly simply pushes the connecting rods 23, 45 forwardly, due to the connection thereof below the hinge point, whereupon the connecting rods 23, 45 simply slide through the respective sleeves 27, 44 separating the stops 24, 46 from the sleeves 27, 44.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

For example, farm machinery often utilizes hydraulic drives with lever controls, including hay mowing machines commonly referred to as windrowers. Such windrowers are often controlled through the manipulation of hydraulic controls levers as described above with respect to spin turn mowers. Such windrowers would also benefit from cruise control operations that are provided by the foot-operated control linkages described above.

Having thus described the invention, what is claimed is:

1. A control linkage for a hydraulically driven mowing machine having a pair of control levers operatively connected to a hydraulic drive mechanism to power the movement of the mowing machine, each of said control levers being pivotally mounted about a hinge point such that a forward movement of said control levers from a central neutral position results in a forward powered movement of the mowing machine and conversely a rearward movement of the control levers from said central neutral position results in a rearward powered movement of the mowing machine, comprising:
   a foot pedal pivotally supported for movement, said foot pedal being operatively connected to said control levers to control only the operating speed of forward movement of the mowing machine when said foot pedal is pivotally moved; and
   a connecting linkage operatively interconnecting said foot pedal and said control levers to permit movement of each said control lever in a rearward direction to affect a change of direction of travel of the mowing machine independently of said foot pedal and while said foot pedal is being pivotally moved, said connecting linkage including:
      a transverse rock shaft supported for rotation about a transverse axis of rotation;
      connecting rods interconnecting said rock shaft and said control levers; and
      a foot pedal connecting rod interconnecting said foot pedal and said rock shaft such that manual movement of said foot pedal causes a corresponding movement in said control levers.

2. The control linkage of claim 1 wherein said connecting linkage permits individual rearward operation of said control levers independently of said foot pedal.

3. The control linkage of claim 2 wherein said connecting linkage further comprises:
   downwardly extending extensions affixed to said control levers below the respective said hinge points;
   mounting tabs extending downwardly from said rock shaft;
   connecting rods interconnecting each respective said mounting tab to the corresponding said extension; and
   said foot pedal connecting rod interconnecting said foot pedal and an upwardly extending mounting tab connected to said rock shaft so that a forward movement of said foot pedal is operable to cause a corresponding simultaneous forward movement of said control levers.

4. The control linkage of claim 3 wherein said connecting linkage further comprises:
   a sleeve mounted on a distal end of each said downwardly extending mounting tab, the corresponding said connecting rod being slidably received within each said sleeve, each said connecting rod including a stop engagable with the corresponding said sleeve to limit the rearward movement of the connecting rod relative to the corresponding said sleeve.

5. The control linkage of claim 4 wherein the connecting linkage further comprises:
   a control lever tension spring connected to each respective control lever extension to bias the control levers toward a forward position corresponding to the forward movement of the mowing machine; and
   a foot pedal tension spring biasing said foot pedal rearwardly in opposition to said control lever tension springs, said foot pedal tension spring exerting a greater biasing force than said control lever tension springs.

6. The control linkage of claim 5 wherein said control lever tension springs are operable to maintain said stops in engagement with the corresponding said sleeves until an external force is exerted on said control levers to cause movement of said control levers independently of said foot pedal.

7. The control linkage of claim 1 further comprising a reverse control linkage including:
   a reverse foot pedal pivotally supported for movement, said reverse foot pedal being operatively connected to said control levers to push said control levers rearwardly through pivotal movement of said reverse foot pedal whenever a rearward movement of the mowing machine is desired; and
   a reverse connecting linkage operatively interconnecting said reverse foot pedal and said control levers to permit individual movement of each said control lever in a rearward direction to affect a change of direction of travel of the mowing machine while said reverse foot pedal is being pivotally moved to affect a rearward movement of said mowing machine.

8. The control linkage of claim 7 wherein said reverse connecting linkage comprises:
   a transverse shaft pivotally supported on said mowing machine and having said reverse foot pedal affixed thereto to cause selective pivotal movement of said transverse shaft;
   a pair of sleeves supported on said transverse shaft; and
   reverse connecting links received, respectively, in said sleeves and being moveable relative thereto, said reverse connecting links being connected to respective said control levers such that said reverse connecting links are movable with the corresponding movement of said control levers, each said reverse connecting link having a stop mounted on a forward end thereof to engage the corresponding said sleeve so that each said sleeve can transfer movement to the corresponding said reverse connecting link.

9. The control linkage of claim 8 wherein said reverse connecting linkage is arranged with the reverse connecting links being connected to said control levers below said hinge point so that a forward pivotal movement of said transverse shaft causes said sleeves to move forwardly with said transverse shaft, said sleeves engaging the respective said stops to pull the corresponding said reverse connecting links forwardly which pulls a lower portion of said control levers forwardly and causes an upper portion of said control levers above said hinge point to move rearwardly and affect a rearward movement of said mowing machine.

10. A control linkage for a hydraulically driven mowing machine having a pair of control levers operatively connected to a hydraulic drive mechanism to power the movement of the mowing machine, each of said control levers being pivotally mounted about a hinge point such that a forward movement of said control levers from a central neutral position results in a forward powered movement of the mowing machine and conversely a rearward movement of the control levers from said central neutral position results in a rearward powered movement of the mowing machine, comprising:
 a single forward speed foot pedal pivotally supported for movement, said forward speed foot pedal being operatively connected to both of said control levers to control only the operating speed of forward movement of the mowing machine when said forward speed foot pedal is pivotally moved forwardly; and
 a connecting linkage operatively interconnecting said forward speed foot pedal and said control levers to transfer the pivotal movement of the single forward speed foot pedal to operate the forward movement of both said control levers simultaneously in a manner to vary the forward movement of said mowing machine while allowing independent manual movement of each respective said control lever in a rearward direction to affect a steering of the mowing machine to change direction of travel thereof while said forward speed foot pedal is being operated.

11. The control linkage of claim 10 wherein said connecting linkage comprises:
 a transverse rock shaft supported for rotational movement about a transverse axis of rotation;
 downwardly extending extensions affixed to said control levers below the respective said hinge points;
 a first connecting rod interconnecting said forward speed foot pedal and an upwardly extending mounting tab connected to said rock shaft so that a forward movement of said forward speed foot pedal is operable to cause a corresponding forward rotation of said rock shaft;
 mounting tabs extending downwardly from said rock shaft;
 second connecting rods interconnecting each respective said mounting tab to the corresponding said extension to transfer forward rotation of said rock shaft into forward movement of said control levers.

12. The control linkage of claim 11 wherein said connecting linkage further comprises:
 a sleeve mounted on a distal end of each said downwardly extending mounting tab, the corresponding said connecting rod being slidably received within each said sleeve, each said connecting rod including a stop engagable with the corresponding said sleeve to limit the rearward movement of the connecting rod relative to the corresponding said sleeve.

13. The control linkage of claim 12 wherein the connecting linkage further comprises:
 a control lever tension spring connected to each respective control lever extension to bias the control levers toward a forward position corresponding to the forward movement of the mowing machine; and
 a foot pedal tension spring biasing said foot pedal rearwardly in opposition to said control lever tension springs, said foot pedal tension spring exerting a greater biasing force than said control lever tension springs, said control lever tension springs being operable to maintain said stops in engagement with the corresponding said sleeves until an external force is exerted on said control levers to cause movement of said control levers independently of said foot pedal.

14. The control linkage of claim 13 further comprising a reverse control linkage including:
 a reverse speed foot pedal pivotally supported for movement, said reverse speed foot pedal being operatively connected to said control levers to push said control levers rearwardly through pivotal movement of said reverse speed foot pedal whenever a rearward movement of the mowing machine is desired; and
 a reverse connecting linkage operatively interconnecting said reverse speed foot pedal and said control levers to permit individual movement of each said control lever in a rearward direction to affect a change of direction of travel of the mowing machine while said reverse speed foot pedal is being pivotally moved to affect a rearward movement of said mowing machine.

15. The control linkage of claim 14 wherein said reverse connecting linkage comprises:
 a transverse shaft pivotally supported on said mowing machine and having said reverse speed foot pedal affixed thereto to cause selective pivotal movement of said transverse shaft;
 a pair of sleeves supported on said transverse shaft; and
 reverse connecting links received, respectively, in said sleeves and being moveable relative thereto, said reverse connecting links being connected to respective said control levers such that said reverse connecting links are movable with the corresponding movement of said control levers, each said reverse connecting link having a stop mounted on a forward end thereof to engage the corresponding said sleeve so that each said sleeve can transfer movement to the corresponding said reverse connecting link, said reverse connecting linkage being arranged with the reverse connecting links being connected to said control levers below said hinge point so that a forward pivotal movement of said transverse shaft causes said sleeves to move forwardly with said transverse shaft, said sleeves engaging the respective said stops to pull the corresponding said reverse connecting links forwardly which pulls a lower portion of said control levers forwardly and causes an upper portion of said control levers above said hinge point to move rearwardly and affect a rearward movement of said mowing machine.

16. A control linkage for a hydraulically driven mowing machine having a pair of control levers operatively connected to a hydraulic drive mechanism to power the movement of the mowing machine, each of said control levers being pivotally mounted about a hinge point such that a forward movement of said control levers from a central neutral position results in a forward powered movement of the mowing machine and conversely a rearward movement of the control levers from said central neutral position results in a rearward powered movement of the mowing machine, comprising:
 a forward speed foot pedal pivotally supported for movement, said forward speed foot pedal being operatively connected to both of said control levers to control only the operating speed of forward movement of the mowing machine when said forward foot pedal is pivotally moved forwardly; and a forward connecting linkage operatively interconnecting said forward foot pedal and said control levers to permit forward movement of both said control levers simultaneously in response to the corresponding forward movement of said forward speed foot pedal, while allowing independent manual movement of each respective said control lever in a rearward direction to affect a change of direction of travel of the mowing machine while said forward speed foot pedal is being pivotally moved forwardly;

a reverse speed foot pedal pivotally supported for movement independently of said forward foot pedal, said reverse speed foot pedal being operatively connected to said control levers to push said control levers rearwardly through pivotal movement of said reverse speed foot pedal whenever a rearward movement of the mowing machine is desired, said reverse speed foot pedal controlling only the operating speed of movement in a rearward direction; and a reverse connecting linkage operatively interconnecting said reverse speed foot pedal and said control levers to permit individual movement of each said control lever in a rearward direction to affect a change of direction of travel of the mowing machine while said reverse speed foot pedal is being operated to affect a rearward movement of said mowing machine.

17. The control linkage of claim 16 wherein said forward connecting linkage comprises:

a transverse rock shaft supported for rotational movement about a transverse axis of rotation;

downwardly extending extensions affixed to said control levers below the respective said hinge points;

a first connecting rod interconnecting said foot pedal and an upwardly extending mounting tab connected to said rock shaft so that a forward movement of said forward speed foot pedal is operable to cause a corresponding forward rotation of said rock shaft;

mounting tabs extending downwardly from said rock shaft;

second connecting rods interconnecting each respective said mounting tab to the corresponding said extension to transfer forward rotation of said rock shaft into forward movement of said control levers.

18. The control linkage of claim 17 wherein said reverse connecting linkage comprises:

a transverse shaft pivotally supported on said mowing machine and having said reverse speed foot pedal affixed thereto to cause selective pivotal movement of said transverse shaft;

a pair of sleeves supported on said transverse shaft; and reverse connecting links received, respectively, in said sleeves and being moveable relative thereto, said reverse connecting links being connected to respective said control levers such that said reverse connecting links are movable with the corresponding movement of said control levers, each said reverse connecting link having a stop mounted on a forward end thereof to engage the corresponding said sleeve so that each said sleeve can transfer movement to the corresponding said reverse connecting link, said reverse connecting linkage being arranged with the reverse connecting links being connected to said control levers below said hinge point so that a forward pivotal movement of said transverse shaft causes said sleeves to move forwardly with said transverse shaft, said sleeves engaging the respective said stops to pull the corresponding said reverse connecting links forwardly which pulls a lower portion of said control levers forwardly and causes an upper portion of said control levers above said hinge point to move rearwardly and affect a rearward movement of said mowing machine.

19. The control linkage of claim 18 wherein said forward connecting linkage further comprises:

a sleeve mounted on a distal end of each said downwardly extending mounting tab, the corresponding said connecting rod being slidably received within each said sleeve, each said connecting rod including a stop engagable with the corresponding said sleeve to limit the rearward movement of the connecting rod relative to the corresponding said sleeve.

20. The control linkage of claim 19 wherein the forward connecting linkage further comprises:

a control lever tension spring connected to each respective control lever extension to bias the control levers toward a forward position corresponding to the forward movement of the mowing machine; and a foot pedal tension spring biasing said foot pedal rearwardly in opposition to said control lever tension springs, said foot pedal tension spring exerting a greater biasing force than said control lever tension springs, said control lever tension springs being operable to maintain said stops in engagement with the corresponding said sleeves until an external force is exerted on said control levers to cause movement of said control levers independently of said foot pedal.

* * * * *